United States Patent [19]

Mukai et al.

[11] Patent Number: 4,570,968
[45] Date of Patent: Feb. 18, 1986

[54] VEHICLE SUSPENSION SYSTEM

[75] Inventors: Yoshiaki Mukai; Iwao Ueno, both of Hiroshima, Japan

[73] Assignee: Mazda Motor Corporation, Hiroshima, Japan

[21] Appl. No.: 556,541

[22] Filed: Nov. 30, 1983

[30] Foreign Application Priority Data

Dec. 6, 1982 [JP] Japan ............................ 57-213771
Dec. 6, 1982 [JP] Japan ............................ 57-184583[U]
Dec. 8, 1982 [JP] Japan ............................ 57-186544[U]

[51] Int. Cl.$^4$ ............................................. B62D 9/02
[52] U.S. Cl. .................................................. 280/664
[58] Field of Search ............... 280/661, 662, 663, 664

[56] References Cited

U.S. PATENT DOCUMENTS 3,689,101  9/1972  Spence ................................ 280/664
3,826,514  7/1974  Kolbe ................................. 280/664

FOREIGN PATENT DOCUMENTS 56-62207  1/1981  Japan .

*Primary Examiner*—Richard A. Bertsch
*Attorney, Agent, or Firm*—Murray, Whisenhunt And Ferguson

[57] ABSTRACT

An improved vehicle suspension system of the double wishbone type including an A-type suspension lower arm which has different strength at different portions thereof suitable for sharing the loads imposed thereon so as to reduce the overall weight thereof. The suspension lower arm, which has a ball-joint mounting portion, is pivotally attached at its front and rear mounting portions to the body of a vehicle for vertical swinging movement and is comprised of a first arm member and a second arm member respectively formed by bending a plate material. The first arm member extends rearwardly from the front mounting portion and the second arm member extends forwardly from the rear mounting portion so that they are superimposed on and secured as by welding to each other at a location near the ball-joint mounting portion. The first and second arm members each have an upper wall and a pair of opposite side walls. The upper wall of the first arm member has a stepped extension which is secured to the lower edges of the opposite side walls of the second arm member so as to form a closed cross-sectional structure. A torsion bar is fixedly mounted on the suspension lower arm at a location upwardly offset from the axis of swinging motion of the suspension lower arm so that ample clearance is formed between the torsion bar and the ground surface, while avoiding interference of the torsion bar with a cross member of a closed cross-sectional disposed rearwardly of the suspension lower arm.

7 Claims, 8 Drawing Figures

VEHICLE SUSPENSION SYSTEM

BACKGROUND OF THE INVENTION

1. Field of the Invention

This invention relates to a vehicle suspension system, and more specifically to an improvement in a suspension system of the double wishbone type.

2. Description of the Prior Art

Conventionally, it has been known, for example, from Japanese Unexamined Utility Model Publication No. 56(1981)-62207, that when a vehicle suspension system of the double wishbone type is applied to a front-engine and front-drive type vehicle, an A-type arm, formed by bending a piece of plate material into the shape of the letter "A", is employed for a suspension lower arm in place of an I-shaped arm so as to improve the rigidity since a suspension lower arm in the form of a letter "I", arranged in a manner to permit a drive shaft to pass therethrough, has low rigidity against lateral loads.

However, with the suspension system in which a suspension lower arm is formed by bending a piece of plate material, if the plate material is made thinner in thickness for reduction of weight, the suspension lower arm becomes less rigid at those portions thereof which require relatively high rigidity, including the portion thereof to which is attached a shock absorber at its lower end, the portion on which is mounted a ball joint, and the portion against which a stopper rubber abuts for restraining the up-and-down swinging motions of the suspension lower arm, and on the other hand, should the thickness of the suspension lower arm be made greater for enhanced rigidity, the total weight thereof becomes greater, thus precluding the weight reduction.

Also, in the above-described construction of the suspension system, a torsion bar is disposed in a manner such that it is aligned at its one end with an axis about which the suspension lower arm is caused to swing up and down. As a result, the mounting position of the torsion bar is necessarily lowered and hence a protector is required for preventing small stones or pebbles thrown up from the road surface from striking against the torsion bar and reducing its durability. However, the provision of the protector is disadvantageous in that it further reduces the ground clearance of the vehicle. Further, the torsion bar extends rearwardly to pass just over a rearwardly disposed cross member of a closed cross-sectional structure with a limited clearance formed therebetween, as a consequence of which it is necessary to lower the position of the cross member or to decrease the cross-sectional area thereof in order to avoid the interference of the suspension lower arm with the cross member as would occur upon swinging motion of the suspension lower arm.

SUMMARY OF THE INVENTION

In view of the above, it is the primary object of the present invention to provide a novel and improved vehicle suspension system of the kind described in which a first arm member and a second arm member, respectively formed by bending a piece of plate material are attached to each other as by welding to form a suspension lower arm in the shape of the letter "A" in a manner such that the respective portions of the suspension lower arm have appropriate rigidities suitable for sharing the loads imposed thereupon, while enabling a substantial reduction in the weight thereof.

A specific object of the present invention is to provide an improved suspension system of the kind described which is further reduced in its weight by making the first arm member, which forms a forward portion of the suspension lower arm requiring less strength, smaller in thickness than the second arm member.

A further specific object of the present invention is to provide an improved suspension system of the kind described in which a torsion bar is fixedly mounted at a location upwardly offset from the pivot axis of the suspension lower arm around which it is swingable in the vertical direction, whereby the clearance between the torsion bar and the ground surface is increased to a practical extent so as to avoid striking therereagainst of small stones or pebbles thrown up from the ground, while at the same time providing sufficient clearance between the torsion bar and the cross member of the closed cross-sectional structure disposed rearwardly of the suspension lower arm.

The above and other objects, features and advantages of the present invention will become apparent from the following detailed description of a preferred embodiment when taken in conjunction with the accompanying drawings.

DESCRIPTION OF THE PREFERRED EMBODIMENTS

Figure 1:
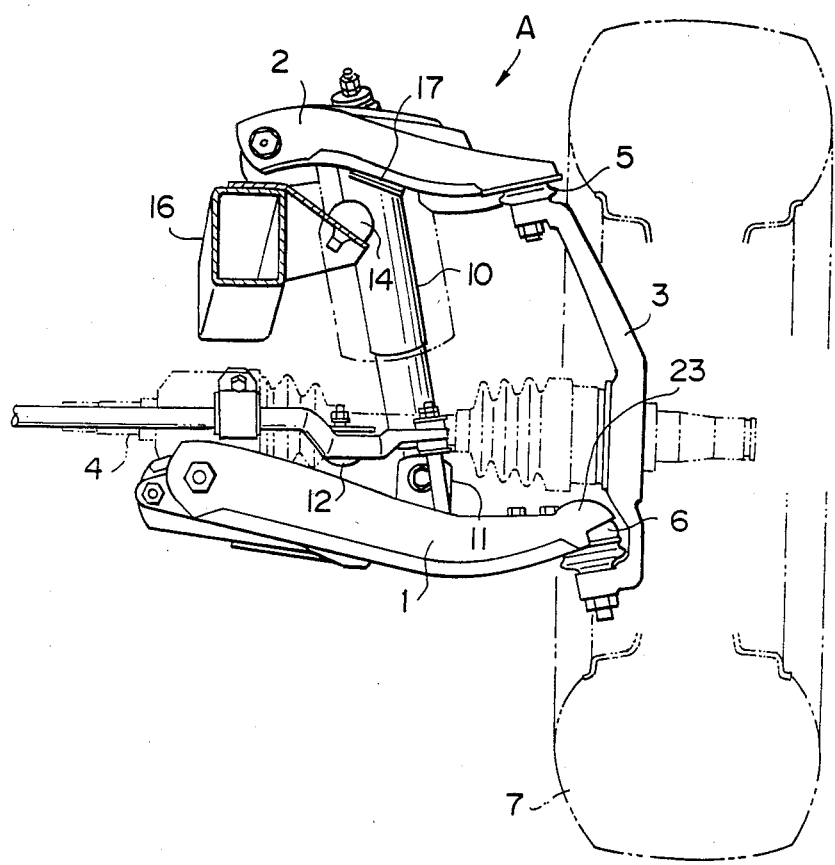
FIG. 1 is a front elevation of a vehicle suspension system constructed in accordance with the principles of the present invention.
Figure 2:
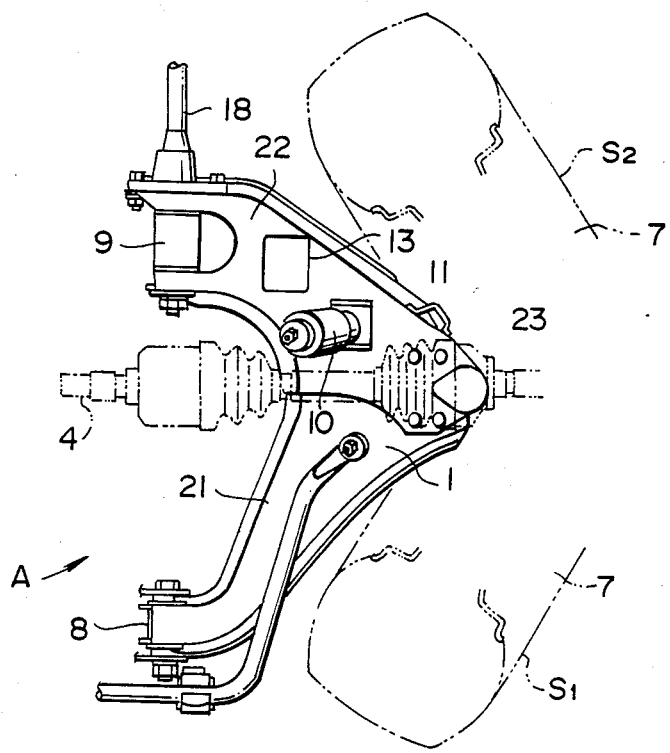
FIG. 2 is a plan view of the same but with a suspension upper arm omitted.
Figure 3:
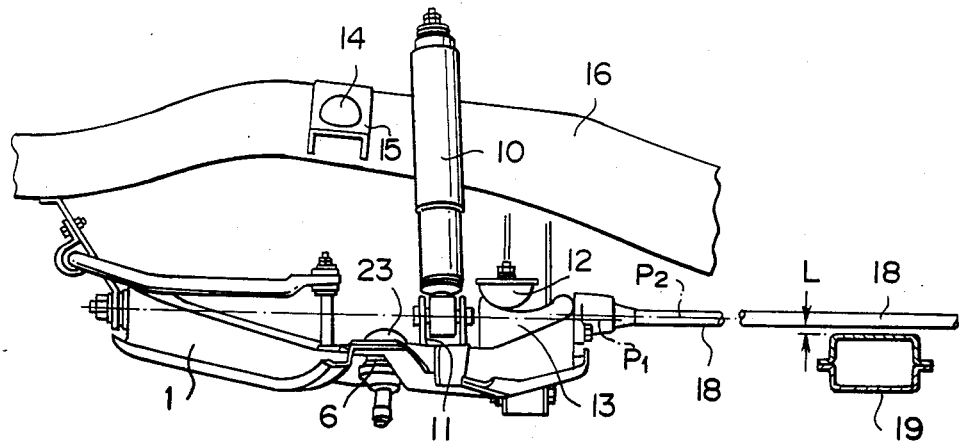
FIG. 3 is a side elevation of the same but with a suspension upper arm omitted.
Figure 4:
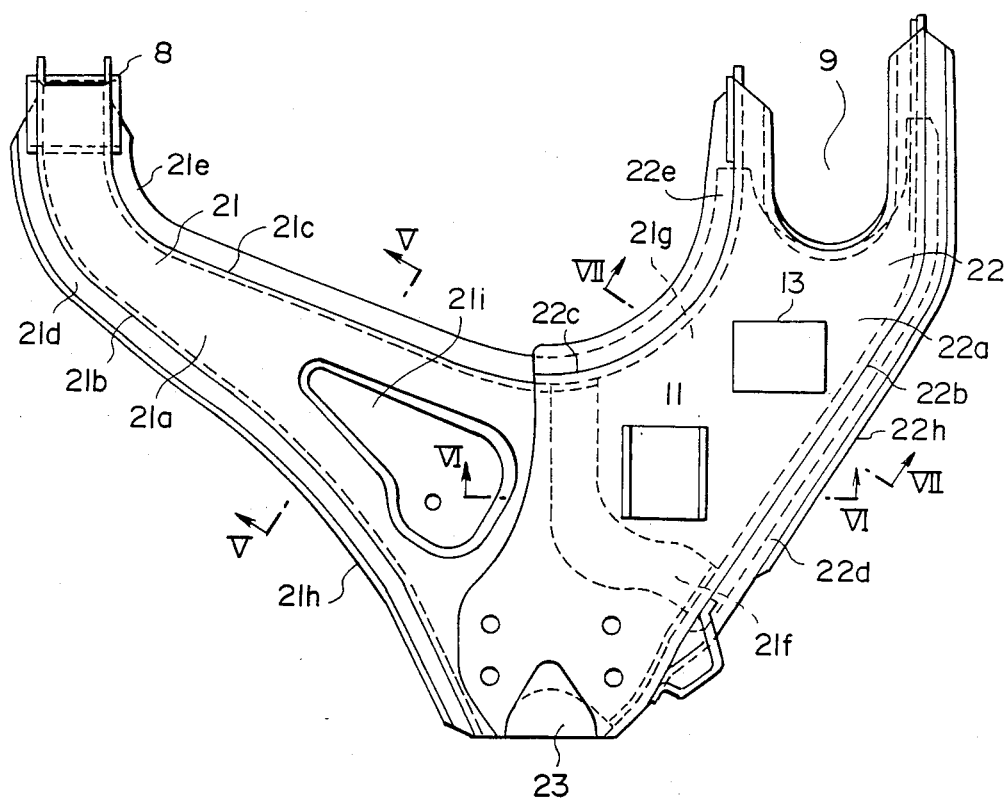
FIG. 4 is a plan view of a suspension lower arm of the present invention.
Figure 5:
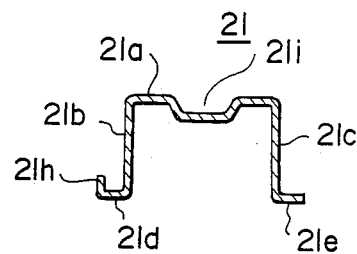
FIG. 5 is a cross-sectional view taken on the line V—V in FIG. 4.
Figure 6:
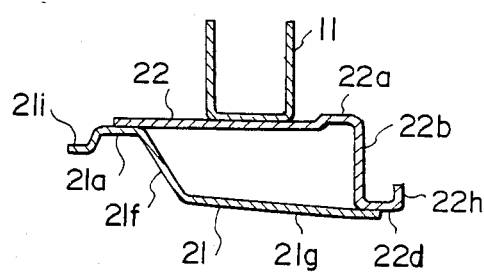
FIG. 6 is a cross-sectional view taken on the line VI—VI in FIG. 4.
Figure 8:
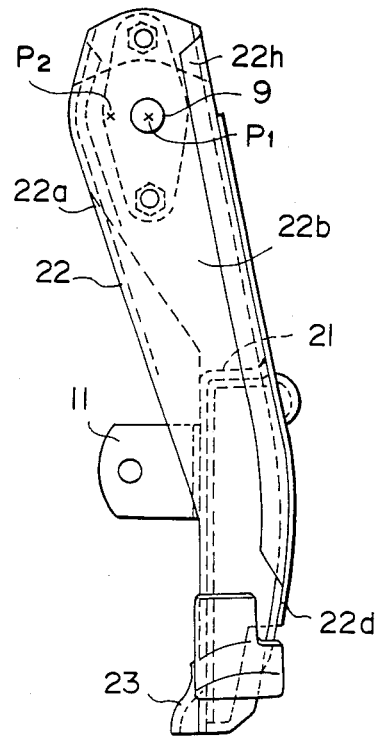
FIG. 8 is a side elevation of the suspension lower arm shown in FIG. 4.
Figure 7:
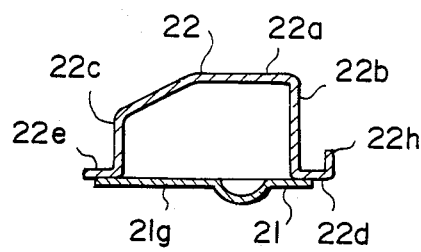
FIG. 7 is a cross-sectional view taken on the line VII—VII in FIG. 4.

Referring to the drawings and first to FIGS. 1 to 3, there is illustrated a suspension system of the present invention, generally represented by reference character A, which is adapted particularly but not exclusively for use with an automotive vehicle of the front-engine and front-drive type, and in which are shown a suspension lower arm 1, a suspension upper arm 2, a knuckle arm 3, a drive shaft 4, a pair of ball joints 5, 6, and a front wheel 7. The suspension arm 1 is in the form of the letter "A" and is supported at its front and rear mounting portions 8, 9 on the body frame of a vehicle (not shown) for up and down movement around an axis extending longitudinally of the body frame.

A shock absorber 10 is connected at its upper end with the body frame (not shown) and is pivoted at its lower end to a support bracket 11 of U-shaped cross section fixedly secured to the suspension lower arm 1.

A lower stopper rubber 12 is mounted on an appropriate portion of the body frame in a manner such that, when the suspension lower arm 1 is caused to swing upwardly, the stopper rubber 12 comes into abutting engagement with an abutment member 13 on the suspension lower arm 1 for limiting the maximum amount of upward swing thereof. Also, an upper stopper rubber 14 is fixedly secured to a front frame member 16 through a mounting bracket 15 and serves to limit the maximum amount of downward swing of the suspension upper arm 2 by abutting engagement thereof with an abutment member 17 on the suspension upper arm 2 during downward swinging motion of the latter. Accordingly, it follows that the vertical motions of both of the suspension arms 1 and 2, jointed with each other by means of the knuckle arm 3, are restricted by the stopper rubbers 12 and 14.

A torsion bar 18 is fixedly connected to the rear mounting portion 9 of the suspension lower arm 1 with its forward end P2 positioned in upwardly offset relation (for example, by about 20 mm) to an axis P1 of up-and-down swinging motion of the suspension lower arm 1, so that the rear end portion thereof extends above a rearwardly disposed cross member 19 with an appropriate clearance L formed therebetween, the cross member being of a closed cross-sectional structure and hence having sufficient strength.

It is to be noted that in FIG. 2, the front wheel 7 is shown in the state of maximum rightward turn by reference character S1 and in the state of maximum leftward turn by reference character S2.

Now, the construction of the suspension lower arm 1 will be described in detail with reference to FIGS. 1 to 7.

The suspension lower arm 1 is comprised of a first arm member 21 and a second arm member 22 both formed by bending a plate material such as steel plate, the second arm member being secured as by welding to the first arm member. Here, it is to be noted that the thickness of the first arm member 21 is less than or at any rate no more than equal to that of the second arm member 22. For example, the first arm member 21 is 3.2 mm thick and the second arm member 22 is 4.0 mm thick.

The first arm member 21 extends rearwardly from the front mounting portion 8 whereas the second arm member 22 extends forwardly from the rear mounting portion 9 so that the second arm member 22 is superimposed on the upper surface of the first arm member 21 in a position near a ball-joint mounting portion 23 formed in the middle of the suspension lower arm 1, thus enhancing the strength therearound.

The first arm member 21 comprises in essense an upper wall 21a having a recessed portion 21i, a pair of side walls 21b, 21c extending downwardly substantially in the vertical direction from the opposite sides of the upper wall 21a, horizontal flanges 21d, 21e respectively extending outwardly from the lower edges of the side walls 21b, 21c substantially in the horizontal direction, an inclined wall 21f extending obliquely downwardly from the rear edge of the upper wall 21a, and an extension 21g in the form of a flat plate extending rearwardly from the lower edge of the inclined wall 21f substantially in the horizontal direction to provide a stepped formation with the upper wall 21a. Also, one of the horizontal flanges (21d) is formed integrally with a reinforcing wall 21h extending upwardly from the outside edge thereof substantially in the vertical direction.

On the other hand, similarly to the first arm member 21, the second arm member 22 includes an upper wall 22a, a pair of side walls 22b, 22c on the opposite sides of the upper wall 22a, a pair of horizontal flanges 22d, 22e on the respective lower edges of the side walls 22b, 22c, and a reinforcing wall 22h adjoining one of the horizontal flanges 22d, 22e.

The second arm member 22 is superimposed at the front edge of the upper wall 22a on the rear edge of the upper wall 21a of the first arm member 21, and is secured at the horizontal flanges 22d, 22e to the side edges of the extension 21g of the first arm member 21 so as to provide a closed cross-sectional structure at the rear end of the suspension lower arm 1.

Fixedly mounted on the upper wall 22a of the second arm member 22 are an abutment member 13, which is adapted to be in abutting engagement with the stopper rubber 12, and a bracket 11, to which is pivoted a shock absorber 10 at its lower end.

As constructed in the above manner, the middle portion of the suspension lower arm 1, which is near the ball-joint mounting portion 23 and hence is required to have sufficient strength, has a double or reinforced construction formed of two superimposed plate members, and the rear portion of the suspension lower arm 1, which requires great strength for mounting of the shock absorber 10 as well as for restriction of swinging motion of the suspension lower arm 1 by means of the stopper rubber 12, has a closed cross-sectional structure, so that the overall rigidity of the suspension lower arm 1 is increased to a substantial extent. On the other hand, the forward portion of the suspension lower arm 1, not requiring high strength, is constructed of a single plate member having a relatively limited thickness. As a consequence, the suspension lower arm 1 has an appropriately distributed strength characteristic in which strength in the respective portions thereof differs in accordance with their load-sharing requirements, and the thicknesses of the respective arm members 21, 22 can be varied as required, which is advantageous from the point of view of weight reduction.

It is to be further noted that the first arm member 21 is extended rearwardly to form the rear end portion of the suspension lower arm 1 into a closed cross-sectional structure, so that no separate members are necessary for this purpose, which is advantageous from the standpoint of shaping. In addition, the forward end of the closed cross-sectional portion is covered with the inclined wall 21f extending from the upper wall 21a of the first arm member 21 so that dirt or other foreign matter, thrown up from the road surface by the vehicle wheels, can be prevented from entering and accumulating in the interior space of the closed cross-sectional portion.

Moreover, when the suspension lower arm 1 is subjected to up-and-down swinging motion, the torsion bar 18 is caused to twist and swing but such a swinging motion of the torsion bar 18 is so limited that there is no substantial effect on the twisting motion of the torsion bar 18, permitting it to perform the intended torsional function as in the case where the axis of swinging motion of the suspension lower arm 1 and the axis of the torsion bar 18 are disposed in alignment with each other. Specifically, the torsion bar 18 acts to urge the suspension lower arm 1 in a direction to return to its original state when the suspension lower arm 1 is caused to displace in a swinging manner.

Accordingly, the torsion bar 18 can be fixedly mounted at a location upwardly offset from the axis of swinging motion of the suspension lower arm 1 so that the vertical distance or height of the torsion bar 18 from the ground surface may be increased without loss of the intended function of the torsion bar 18. As a consequence, it is ensured that the torsion bar 18 has a relatively large ground clearance even when it is equipped with a protector (not shown) for preventing small stones or pebbles thrown up from the road surface from striking against the torsion bar 18. In addition, in case where there is employed a cross member 17 having a relatively large cross-sectional area for increased strength, it is possible to provide a relatively large clearance between the torsion bar 18 and the cross member 17.

We claim:

1. A vehicle suspension system including an A-type suspension lower arm having a front mounting portion pivotally attached to the body of a vehicle, a rear mounting portion pivotally attached to the vehicle body, and a ball-joint mounting portion disposed between said front and rear mounting portions, said suspension lower arm being adapted to be swung in the vertical direction around said front and rear mounting portions, said suspension lower arm comprising a first arm member and a second arm member respectively formed by bending a plate material and having an upper wall, with a rear edge, and a pair of side walls on the opposite sides of said upper wall, said first and second arm members each having a pair of horizontal flanges respectively formed at the lower edges of their side walls, said first arm member extending rearwardly from said front mounting portion, said second arm member extending forwardly from said rear mounting portion and being superimposed on and secured as by welding to said first arm member at a location near said ball-joint mounting portion said extension of said first arm member being secured to the horizontal flanges at the lower edges of said opposite side walls of said second arm member so as to provide a closed cross-sectional structure.

2. A vehicle suspension system as defined in claim 1 wherein said extension of said first arm member comprises an inclined wall bent downwardly from the rear edge of the upper wall of said first arm member and then horizontally to form a stepped extension in the form of a flat plate.

3. A vehicle suspension system as defined in claim 1, further comprising a shock absorber arranged vertically and connected at its upper end to the vehicle body and at its lower end to said upper wall of said second arm member.

4. A vehicle suspension system as defined in claim 1 wherein said first arm member is smaller in thickness than said second arm member.

5. A vehicle suspension system as defined in claim 4, further comprising a torsion bar extending from said suspension lower arm and being fixedly mounted thereon at a location upwardly offset from the axis of swinging motion of said suspension lower arm.

6. A vehicle suspension system as defined in claim 1 wherein said second arm member is disposed rearwardly of said first arm member, said suspension system further comprising a torsion bar mounted on said second arm member at its one end and extending therefrom in the rearward direction.

7. A vehicle suspension system as defined in claim 6 wherein said torsion bar is fixedly mounted on said second arm member at a location upwardly offset from the axis of swinging motion of said suspension lower arm.

* * * * *